UNITED STATES PATENT OFFICE.

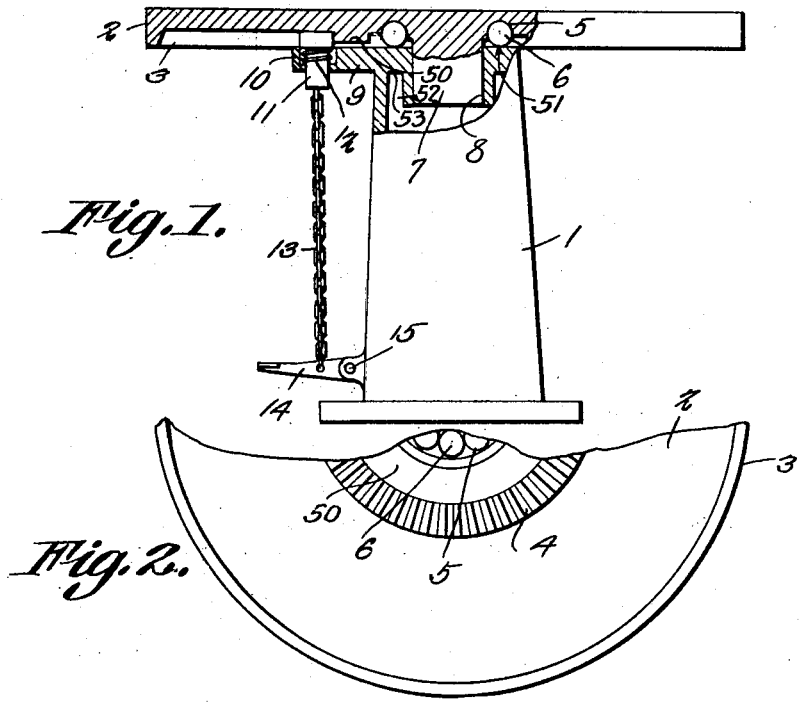

JOSEPH H. STALEY, OF KNIGHTSTOWN, INDIANA.

ROTATABLE WORKTABLE.

1,409,257. Specification of Letters Patent. Patented Mar. 14, 1922.

Application filed October 29, 1918. Serial No. 260,216.

*To all whom it may concern:*

Be it known that I, JOSEPH H. STALEY, a citizen of the United States, residing at Knightstown, in the county of Henry and State of Indiana, have invented a new and useful Rotatable Worktable, of which the following is a specification.

The device forming the subject matter of this application is a rotatable work bench, and one object of the invention is so to construct the device that the same will possess both lightness and strength. Another object of the invention is to provide a novel means for sustaining the latch which holds the rotatable top of the bench against rotation, and for retaining in place, the balls which support the top, should the balls become detached from a ball race wherein they are located.

Figure 1 is a view in elevation, partly in section, of a table constructed in accordance with the invention;

Figure 2 is a fragmentary bottom plan view of the table top.

The table herein shown consists of a pedestal 1, which may be of any suitable material but is, preferably of metal, and upon this pedestal is supported the top 2. The top 2 may be formed with an apron 3, and on the under surface of the top is provided an annular rack 4. The faces or sides of the teeth of the rack are inclined at an angle of forty-five degrees to the vertical so as to provide a strong firm tooth.

A ball race 5 is formed in the lower face of the table top, and is positioned within and formed concentric with the rack 4. Balls 6 are provided in the ball race 5 and rest upon the upper face of the pedestal 1 and support the top thereon. The ball race 5 encircles a boss or stub shaft 7 which depends from the central portion of the top and enters a recess or socket 8 formed in the pedestal 1. This stub 7 positioned within the socket 8 will prevent the table top from tilting when a weight is placed to one side of the center thereof.

The pedestal 1 has a laterally extending arm 9 formed at the upper end thereof, and this arm is provided, adjacent its outer end, with a countersunk aperture 10 in which a dog 11 has a sliding fit. The dog 11 is encircled by a compression spring 12, which is housed within the countersunk portion of the aperture 10 and is confined between the head of the dog 11 and the bottom of the countersunk portion. This spring serves to retain the dog 11 in engagement with the teeth of the rack 4 and normally hold the top 2 against rotation.

For the purpose of drawing the dog 11 against the tension of the spring 12 from contact with the teeth of rack 4, a chain 13 or the like may be secured to the dog, from which it depends, and the lower end thereof secured to a treadle 14 which is pivotally connected to ears 15, projecting laterally from the pedestal 1 near its lower end.

As hereinbefore stated, one object of the invention is to promote lightness in the device. With this end in view, the pedestal 1 is hollow, the upper end wall 53 of the pedestal is co-extensive in cross section with the pedestal and has merely the laterally extended arm 9, the socket 8 is short, the stub 7 is no longer than the socket, and an annular groove 52 is formed between the socket and the pedestal.

With a view to reducing friction, the balls 6, although received in the race 5 of the top 2, bear upon the smooth upper surface 51 of the end wall 53 of the pedestal 1, and are not received in a ball race formed in the said end wall. This construction, although reducing friction, and rendering the balls 6 peculiarly effective in supporting the top 2 for rotation, has one minor disadvantage, in that the balls may possibly become detached from the race 5. This disadvantage, however, is offset by forming, on the under surface of the table 2, a depending annular rib 50, the balls 6 being disposed between the rib 50 and the stub 7. Consequently, although the balls 6 might ride out of the ball race 5, they will not roll laterally off the end wall 53 of the pedestal, the rib 50 preventing such an operation. The rib 50 exercises a two-fold office. Not only does it have a function as a retainer for the balls 6, under the conditions above pointed out, but, as well, the rib serves to sustain the dog or latch 11, when the latch is engaged with the rack 4, the rib forming one side of the rack and cooperating with the dog or latch, when the dog is seated, as shown in Figure 1.

Having described my invention, what I claim as new, is:—

A device of the class described embodying a hollow pedestal including an upper end wall co-extensive in cross section with the pedestal and having a smooth upper surface, the end wall being provided with a socket depending within the pedestal, the socket being short and there being an annular groove between the socket and the pedestal; the end wall having an outwardly extended arm; a rotatable top including a stub journaled in the socket and of approximately the same length as the socket, the top being provided on its under surface with a continuous, shallow, annular rack, and being provided with a depending annular rib located within the rack and forming a side wall therefor, the top having a ball race disposed between the rib and the stub; a latch mounted for right line sliding movement in the arm and cooperating with the rack, the latch engaging the rib when the latch cooperates with the rack; spring means for advancing the latch; means for retracting the latch; and balls in the ball race and cooperating with the smooth surface of the end wall of the pedestal, the balls being located between the rib and the stub.

In testimony that I claim the foregoing as my own, I have hereto affixed my signature.

JOSEPH H. STALEY.